(12) United States Patent
Takata et al.

(10) Patent No.: US 8,182,574 B2
(45) Date of Patent: May 22, 2012

(54) METAL FINE PARTICLES, COMPOSITION CONTAINING THE SAME, AND PRODUCTION METHOD FOR PRODUCING METAL FINE PARTICLES

(75) Inventors: Yoshiaki Takata, Naka (JP); Hiroki Hirata, Naka (JP); Jun-etsu Satoh, Naka (JP); Yasuro Niidome, Fukuoka (JP); Sunao Yamada, Fukuoka-ken (JP); Koji Nishioka, Fukuoka (JP); Hideya Kawasaki, Fukuoka (JP); Daigou Mizoguchi, Hitachinaka (JP); Masanori Nagai, Otawara (JP); Masato Murouchi, Otawara (JP); Masaoki Ishihara, Otawara (JP)

(73) Assignees: Mitsubishi Materials Corporation, Tokyo (JP); Dai Nippon Toryo Co., Ltd., Osaka (JP)

( * ) Notice: Subject to any disclaimer, the term of this patent is extended or adjusted under 35 U.S.C. 154(b) by 0 days.

(21) Appl. No.: 12/730,776

(22) Filed: Mar. 24, 2010

(65) Prior Publication Data

US 2010/0229684 A1   Sep. 16, 2010

Related U.S. Application Data

(62) Division of application No. 10/570,523, filed as application No. PCT/JP2004/013087 on Sep. 2, 2004, now abandoned.

(30) Foreign Application Priority Data

Sep. 5, 2003 (JP) ................. 2003-314208
Apr. 9, 2004 (JP) ................. 2004-116253
Apr. 9, 2004 (JP) ................. 2004-116254

(51) Int. Cl.
*B22F 9/24* (2006.01)

(52) U.S. Cl. .............................. 75/371; 977/899
(58) Field of Classification Search .................. None
See application file for complete search history.

(56) References Cited

U.S. PATENT DOCUMENTS

| 7,225,082 | B1 | 5/2007 | Natan et al. | |
| 7,238,261 | B2 | 7/2007 | Risen, Jr. et al. | |
| 7,527,668 | B2 * | 5/2009 | Hirata et al. | 75/371 |
| 7,592,001 | B2 * | 9/2009 | Powers et al. | 424/61 |

(Continued)

FOREIGN PATENT DOCUMENTS

EP   1623954   2/2006

(Continued)

OTHER PUBLICATIONS

International Search Report for PCT/JP2004/013087 mailed Dec. 14, 2004.

(Continued)

*Primary Examiner* — George Wyszomierski
(74) *Attorney, Agent, or Firm* — Leason Ellis LLP.

(57) ABSTRACT

The present invention provides metal fine particles which have selective wavelength absorption characteristics in a wavelength region from visible light to near infrared light, and have sharp absorption characteristics, and influences little the surrounding wavelength, and therefore, they yield tones having high chroma. The present invention provides metal fine particles wherein an aspect ratio is in a range from 1.1 to 8.0, a maximum absorption wavelength in plasmon absorption is in a range from 400 nm to 1,200 nm, and an absorption coefficient at a peak position of the maximum absorption wavelength is in a range from 6,000 to 20,000 L/mol·cm (measurement concentration: $1.6 \times 10^{-4}$ mol/L, and solvent: water).

2 Claims, 6 Drawing Sheets

U.S. PATENT DOCUMENTS

| | | | |
|---|---|---|---|
| 7,691,176 B2 * | 4/2010 | Niidome et al. | 75/345 |
| 7,718,094 B2 * | 5/2010 | Alexandridis et al. | 252/514 |
| 7,846,976 B2 * | 12/2010 | Mizoguchi et al. | 516/97 |
| 2002/0187172 A1 | 12/2002 | Reb et al. | |
| 2005/0171433 A1 | 8/2005 | Boppart et al. | |
| 2005/0175540 A1 | 8/2005 | Oraevsky et al. | |
| 2006/0110738 A1 | 5/2006 | Frasch et al. | |
| 2006/0196309 A1 | 9/2006 | Niidome et al. | |

FOREIGN PATENT DOCUMENTS

| | | |
|---|---|---|
| JP | 48-55169 A | 8/1973 |
| JP | A-62-001826 | 1/1987 |
| JP | A-62-061630 | 3/1987 |
| JP | A-62-063603 | 3/1987 |
| JP | 4-323309 A | 11/1992 |
| JP | 4-323310 A | 11/1992 |
| JP | 11-80647 A | 3/1999 |
| JP | A-11-319538 | 11/1999 |
| JP | 2000-144217 | 5/2000 |
| JP | 2001-64794 A | 3/2001 |
| JP | 2001-108815 A | 4/2001 |
| JP | 2002-22935 A | 1/2002 |
| JP | A-2002-102679 | 4/2002 |
| JP | 2003-225899 A | 8/2003 |

OTHER PUBLICATIONS

"The Shape Transition of Gold Nanorods" by Chang et al., Department of Chemistry, National Chung Cheng University, Republic of China, Langmuir, vol. 15, No. 3, 1999, pp. 701-709, American Chemical Society.
Patent Abstracts of Japan for JP11-80647 published Mar. 26, 1999.
Patent Abstracts of Japan for JP2001-108815 published Apr. 20, 2001.
Patent Abstracts of Japan for JP2002-22935 published Jan. 23, 2002.
Patent Abstracts of Japan for JP2001-64794 published Mar. 13, 2001.
"Wet Chemical Synthesis of High Aspect Ratio Cylindrical Gold Nanorods" by Jana, et al., J. Phys. Chem. B vol. 105, No. 19, 2001, pp. 4065-4067.
"Photochemical Synthesis of Gold Nanorods" by Kim et al., J. Am. Chem. Soc., Vo. 124, No. 48, 2002, pp. 14316-14317.
Niidome, Y. et al. "Dichroism of Poly(vinylalcohol) Films Containing Gold Nanorods Induced by Polarized Pulsed-Laser Irradiation." Japan Journal of Applied Physics. vol. 42, p. 1749-1750 (2003).
Wei, Z. et al. "Synthesis and Manipulation of High Aspect Ratio Gold Nanorods Grown Directly on Surfaces." Langmuir. vol. 20, No. 11, p. 4322-4326 (2004).
Brantley et al. "An Improved Synthesis of High-Aspect-Ratio Gold Nanorods." Adv. Mater, 2003, vol. 15, No. 5, Mar. 4, pp. 414-416.
"Structural and Morphological Transitions in Gold Nanorods: A Computer Simulation Study" by Wang et al., Journal of Physical Chemistry B 2003, 107, pp. 9214-9219.
Link, S. et al., "Simulation of the Optical Absorption Spectrum of Gold Nanorods as a Function of Their Aspect Ratio and the Effect of the Medium Dielectric Constant", J. Phys. Chem. B, vol. 103, pp. 3073-3077, 1999.
Nikobakht, B. et al., "Preparation and Growth Mechanism of Gold Nanorods (NRs) Using Seed-Mediated Growth Method", Chem. Mater., vol. 15, pp. 1957-1962, 2003.
G. J. Lee et al., Preparation of silver nanorods through the control of temperature and pH of reaction medium, Materials Chemistry and Physics, Jan. 23, 2004, pp. 197-204, 84.
Y. Niidome et al., Rapid synthesis of gold nanorods by the combination of chemical reduction and photoirradiation process; morphological changes depending on the growing processes, Chemical Communications., 2003, pp. 2376-2377, 18.
Chinese Office Action mailed Mar. 10, 2010 for the corresponding Chinese Patent Application No. 200810092906.5.
Chinese Office Action mailed Mar. 31, 2010 for the corresponding Chinese Patent Application No. 200810092905.0.
Japanese Office Action mailed Feb. 2, 2010 for the corresponding Japanese Patent Application No. 2004-024006 (English translation provided).
Japanese Office Action mailed May 6, 2010 for the corresponding Japanese Patent Application No. 2004-024006 (English translation provided).

* cited by examiner

METAL FINE PARTICLES, COMPOSITION CONTAINING THE SAME, AND PRODUCTION METHOD FOR PRODUCING METAL FINE PARTICLES

CROSS-REFERENCE TO PRIOR APPLICATION

This is a Divisional Application of the U.S. application Ser. No. 10/570,523 filed Jun. 12, 2006, which is U.S. National Phase Application under 35 U.S.C. §371 of International Patent Application no. PCT/JP2004/013087 filed Sep. 2, 2004, and claims the benefit of Japanese Patent Application Nos. 2003-314208 filed Sep. 5, 2003, 2004-116253 filed Apr. 9, 2004 and 2004-116254 filed Apr. 9, 2004, all of which are incorporated by reference herein. The International Application was published in Japanese on Mar. 17, 2005 as WO 2005/023466 al under PCT Article 21(2).

TECHNICAL FIELD

The present invention relates to metal fine particles which have selective wavelength absorption characteristics at a certain wavelength in a wavelength region from visible light to near infrared light, and have sharp absorption characteristics having a high absorbance and a narrow absorption spectrum width at the wavelength, and preferably relates to gold fine particles, in particular, gold fine particles having a rod shape in nano-size (abbreviated as "gold nano-rods" below).

In addition, the present invention relates to a production method for producing metal fine particles, wherein an aspect ratio of the metal fine particles can be easily controlled.

Furthermore, the present invention relates to a composition containing the metal fine particles or the metal fine particles obtained by the production method.

BACKGROUND ART

When metal fine particles are irradiated with light, a resonance absorption phenomenon, which is so-called plasmon absorption, occurs. In the resonance absorption phenomenon, an absorption wavelength differs depending on the kind and shape of metal. For example, a gold colloid, in which spherical gold fine particles are dispersed in water, has an absorption region around 530 nm. In contrast, it is well known that in the case of gold fine particles in a rod shape having a length in a short axis of about 10 nm, they have an absorption at a long wavelength side, which is attributed to a long axis of the rods, in addition to the absorption at 530 nm, which is attributed to the short axis of the rods (S-S. Chang et al. Langmuir, 1999, 15th issue, pages 701 to 709).

It has been suggested that a resin composition containing noble metal fine particles as a coating or pigment can be used for optical materials such as an optical filter (Japanese Patent Application, First Publication No. H11-80647). As materials used for an optical filter, a color filter containing a dye having a specific chemical structure (Japanese Patent Application, First Publication No. 2001-108815), and an optical filter comprising a coating containing both a dye having a specific chemical structure and a metal complex (Japanese Patent Application, First Publication No. 2002-22935) are known. The former color filter comprises a striped pattern of three colors of red, green and blue on a transparent substrate. The latter optical filter has a light transmissivity of 0.01 to 30% in a wavelength range from 750 to 1,100 nm.

A production method for producing metal fine patterns using plasmon excitation of metal fine particles is also known (Japanese Patent Application, First Publication No. 2001-64794). This production method is a method using a phenomenon whereby when metal fine particles are supported on the flat surface of a semiconductor or solid metal, metal fine particles linearly elongate due to plasmon excitation.

As explained above, it is known that noble fine particles can be used for a coating or pigment for resin compositions; however, the noble fine particles used are spherical. For example, plasmon color, which spherical gold fine particles generate, is limited to visible light such as blue, bluish-purple, and reddish-purple. Therefore, a composition which uses plasmon absorption of spherical gold fine particles, or a substrate which is obtained by coating or kneading the composition, only has tones such as blue, bluish-purple, and reddish-purple.

Many color filters containing a dye having a specific chemical structure discolor or decrease their absorption capacity when a long time has passed, because the dye has inferior heat resistance, light resistance, and chemical resistance compared with pigments and metal fine particles, and they have problems in reliability. In a method in which metal fine particles are made to grow on the surface of a solid, the metal fine particles are supported and grown on the surface of the solid. Therefore, it is impossible to disperse the metal fine particles in many solvents, binders, and production of a coating is difficult. In addition, in Patent Publications, plasmon absorption of metal fine particles is used only to grow the metal fine particles during synthesis steps, and selective light absorption characteristics at a specific wavelength due to a long direction of the metal fine particles is not used.

The present invention solves the problems of conventional color filters or the fine linear elongation method of metal fine particles, and yields tone, which is not yielded by conventional spherical metal fine particles, by making metal fine particles into a rod shape having an aspect ratio of 1.1 or greater, that is, metal nano-rods. In addition, the present invention provides a pigment having excellent wavelength absorption properties and heat resistance, and the like, and metal fine particles that can be suitably used for an optical filter material.

The metal nano-rods are expected to be used for a variety of applications such as optical filter materials, near infrared light absorbing materials, pigments, and cosmetics, which use light absorption properties of the metal nano-rods, and conductive materials, wiring materials, electromagnetic interference shielding materials which use conductivity of the metal nano-rods.

As a production method for producing metal nano-rods, an electrochemical reduction method, a chemical reduction method, a photoreduction method, an ultrasonic wave irradiation method, and the like are known.

The electrochemical reduction method is a method in which gold fine particles are obtained by putting a gold-plated anode and a platinum-plated cathode in an electrolyte containing a surfactant, and passing a constant current between the anode and cathode. Gold ions generated at the anode are reduced at the cathode, and become gold fine particles. Then, the gold fine particles grow into a rod shape due to the functions of the surfactant, and become gold nano-rods in nano-size. In the electrolytic method, a silver plate is immersed in an electrolyte. It is reported that the area of the immersed silver plate in the electrolyte affects the length of the rods (Langmuir, 1999, 15th issue, pages 701 to 709). However, the amount of eluted silver and elution rate change depending on surface conditions of the silver plate. Therefore, it is difficult to adjust the area of the immersed silver plate, and control sufficiently the aspect ratio of the metal nano-rods.

The chemical reduction method is a method in which gold nano-rods are obtained by adding a reducing agent to an aqueous solution of chloroauric acid, reducing chloroauric acid, growing gold nano-particles to obtain "seed particles", transferring the seed particles to an aqueous solution of chloroauric acid, and growing the seed particles in the aqueous solution to obtain gold nano-rods (J. Phys. Chem. B, 2001, 105th issue, pages 4065 to 4067). In this method, it is possible to control the length of the obtained rods by changing the amount of seed particles which are transferred to a growth reaction vessel. However, a reaction vessel for obtaining the seed particles and a reaction vessel for growing the seed particles are necessary, and production processes are complicated and troublesome.

The photoreduction method is a method in which gold fine particles are obtained by irradiating ultraviolet light to an aqueous solution of chloroauric acid, and reducing chloroauric acid in the solution (J. Am. Chem. Soc. 2002, 124th issue, pages 14,316 to 14,318). This method does not need two vessels, which are required in the chemical reduction method, and the length of the rods can be controlled by adjusting the irradiation time. However, this method has a problem in that the reaction time is long.

The present invention solves these problems of conventional production methods for producing metal fine particles. The present invention provides a production method which can easily control the aspect ratio of metal fine particles, and compositions containing the metal fine particles produced by the production method.

In addition, the present invention further provides preferable usages of the metal fine particle compositions.

DISCLOSURE OF THE INVENTION

Specifically, the present invention provides the following metal fine particles, production methods therefor, and metal fine particle compositions.

(1) Metal fine particles wherein an aspect ratio is in a range from 1.1 to 8.0, a maximum absorption wavelength in plasmon absorption is in a range from 400 nm to 1,200 nm, and an absorption coefficient at a peak position of the maximum absorption wavelength is in a range from 6,000 to 20,000 L/mol·cm (measurement concentration: $1.6 \times 10^{-4}$ mol/L, and solvent: water).

(2) Metal fine particles wherein an aspect ratio is in a range from 1.1 to 8.0, a maximum absorption wavelength in plasmon absorption is in a range from 550 nm to 1,200 nm, and a half band width of an absorption spectrum at the maximum absorption wavelength is 200 nm or less.

(3) Metal fine particles according to (1) or (2), wherein the metal fine particles are gold nano-rods and a maximum absorption wavelength in plasmon absorption is in a range from 550 nm to 1,200 nm.

(4) Metal fine particles according to (3), wherein the gold nano-rods are produced by chemically reducing chloroauric acid in a solution and then light reducing, an absorption coefficient at a peak position of the maximum absorption wavelength is in a range from 6,000 to 20,000 L/mol·cm (measurement concentration: $1.6 \times 10^{-4}$ mol/L, and solvent: water), and a half band width of an absorption spectrum at the maximum absorption wavelength is 200 nm or less.

(5) A composition containing the metal fine particles according to (1) or (2).

(6) A composition according to (5), wherein the composition further contains a dispersing agent containing at least one of a nitrogen atom and a sulfur atom, and a binder.

(7) A production method for producing metal fine particles comprising the steps of; reducing metal ions in an aqueous solution containing a surfactant; and controlling an aspect ratio of the metal fine particles by obtaining the metal fine particles under conditions in which an acid or alkali is added. In the production method, it is preferable that the reducing and controlling be conducted at least partly simultaneously. Specifically, in one embodiment, the reducing and controlling are performed simultaneously. In other words, in the embodiment, the reducing and controlling start and end simultaneously. In another embodiment, after starting the reducing, controlling starts, and then the reducing and controlling simultaneously end.

(8) A production method for producing metal fine particles according to (7), wherein the acid is at least one selected from the group consisting of nitric acid, sulfuric acid, hydrochloric acid, or hydrobromic acid, and the alkali is at least one selected from the group consisting of sodium hydroxide, potassium hydroxide, or aqueous ammonia.

(9) A production method for producing metal fine particles comprising the steps of reducing metal ions in an aqueous solution containing a surfactant; and controlling an aspect ratio of the metal fine particles by performing the reduction reaction while adjusting a solution temperature. In the production method, it is preferable that the reducing and controlling be conducted at least partly simultaneously.

(10) A production method for producing metal fine particles according to (7), wherein the metal ions are reduced in an aqueous solution containing a surfactant by a method selected from the group consisting of a chemical reduction method, an electrochemical reduction method, a photoreduction method, and a combination of a chemical reduction method and a photoreduction method, and the obtained metal fine particles are metal nano-rods.

(11) A production method for producing metal fine particles according to (7), wherein the metal ions are reduced in an aqueous solution containing a surfactant by an electrochemical reduction method using an aqueous solution containing at least one selected from the group consisting of surfactants denoted by the following chemical formulas A, B, and C as an electrolyte, and the aspect ratio of the metal fine particles is made small by adding the acid, or the aspect ratio of the metal fine particles is made large by adding the alkali.

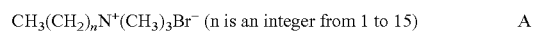

CH$_3$(CH$_2$)$_n$N$^+$(CH$_3$)$_3$Br$^-$ (n is an integer from 1 to 15)  A

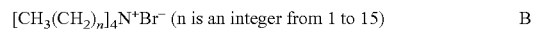

[CH$_3$(CH$_2$)$_n$]$_4$N$^+$Br$^-$ (n is an integer from 1 to 15)  B

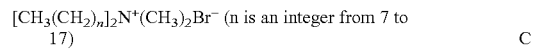

[CH$_3$(CH$_2$)$_n$]$_2$N$^+$(CH$_3$)$_2$Br$^-$ (n is an integer from 7 to 17)  C

(12) A production method for producing metal fine particles according to (7), wherein the metal ions are reduced by a combination of a chemical reduction method using a reducing agent and a photoreduction method, and the aspect ratio of the metal fine particles is made large by adding the acid or the aspect ratio of the metal fine particles is made small by adding the alkali.

(13) A production method for producing metal fine particles according to (12), wherein the reducing agent in a metal ion aqueous solution is selected from the group consisting of ascorbic acid, citric acid and salts thereof; hydroxylamine hydrochloride, a hydrazine compound, succinic acid, and salts thereof; and an amine, the acid is selected from the group consisting of nitric acid, sulfuric acid, hydrochloric acid, and hydrobromic acid, and the alkali is selected from the group consisting of sodium hydroxide, potassium hydroxide, and aqueous ammonia.

(14) A production method for producing metal fine particles according to (9), wherein the aspect ratio of the metal fine particles is made small by increasing the solution temperature of the aqueous solution containing metal ions, or the aspect ratio of the metal fine particles is made large by decreasing the solution temperature of the aqueous solution containing metal ions.

(15) A composition containing metal fine particles produced by the production method for producing metal fine particles according to (7) or (9).

(16) A coating composition, coating, transparent sheet, or film made of the composition according to (5) or (15).

(17) An optical filter material, wiring material, electrode material, catalyst, pigment, cosmetic, near infrared light absorbing material, anticounterfeit ink, electromagnetic interference shielding material, surface reinforcing fluorescence sensor, biomarker, nano-waveguide, recording material, recording element, polarization material, drug supporter for drug delivery system (DDS), biosensor, DNA chip, or test drug, which contains the metal fine particles according to (1) or (2).

(18) An optical filter material, wiring material, electrode material, catalyst, pigment, cosmetic, near infrared light absorbing material, anticounterfeit ink, electromagnetic interference shielding materials, surface reinforcing fluorescence sensor, biomarker, nano-waveguide, recording material, recording element, polarization material, drug supporter for drug delivery system (DDS), biosensor, DNA chip, or test drug, which contains the metal fine particles obtained by the production method for producing metal fine particles according to (7) or (9).

BEST MODE FOR CARRYING OUT THE INVENTION

Below, the present invention is explained in detail.

First, the metal fine particles of the present invention will be explained.

The first metal fine particles of the present invention have an aspect ratio in a range from 1.1 to 8.0, a maximum absorption wavelength in plasmon absorption in a range from 400 nm to 1,200 nm, and an absorption coefficient at a peak position of the maximum absorption wavelength in a range from 6,000 to 20,000 L/mol·cm (measurement concentration: $1.6 \times 10^{-4}$ mol/L, and solvent: water).

The second metal fine particles of the present invention have an aspect ratio in a range from 1.1 to 8.0, a maximum absorption wavelength in plasmon absorption in a range from 550 nm to 1,200 nm, and a half band width of an absorption spectrum at the maximum absorption wavelength of 200 nm or less.

In the metal fine particles of the present invention, it is preferable that the metal fine particles be gold nano-rods. Gold nano-rods have selective wavelength absorbing characteristics depending on the length in a long axis thereof. Specifically, the absorbance due to the long axis of the gold nano-rods is larger than the absorbance at 530 nm due to the short axis, and a maximum absorption occurs in a range from 550 nm to 1,200 nm.

When the aspect ratio is less than 1.1, the shape is subsequently spherical. Therefore, it is difficult to yield wavelength absorption characteristics in a long wavelength region of 550 nm or greater. In contrast, if the aspect ratio is greater than 8.0, a half band width of an absorption spectrum at the maximum absorption wavelength is easily larger than 200 nm, and it is difficult to obtain a sharp absorption property.

In general, an absorbance A can be calculated by the following Lambert Beer formula [1], wherein $\epsilon$ means an absorption coefficient of a material through which light is transmitted, L means an optical path length of the material placed in a quartz cell for measurement, and C means a concentration of the material. The absorption coefficient $\epsilon$ is a specific value of the material through which light is transmitted, and the more the absorption coefficient $\epsilon$ increases, the more the absorbance increases, and an absorption spectrum having a high peak is obtained.

$$A = \epsilon L C \qquad [1]$$

In the gold nano-rods of the present invention, when the concentration of the gold fine particles in the measurement sample solution is $1.6 \times 10^{-4}$ mol/L (solvent: water), and the optical path length of the measurement cell is 1 cm, the absorption coefficient in a wavelength range from 550 nm to 1,200 nm is in a range from 6,000 to 20,000 L/mol·cm. Therefore, the absorbance of the peak position at the maximum absorption wavelength is approximately in a range from 0.96 to 3.2.

Figure 1:
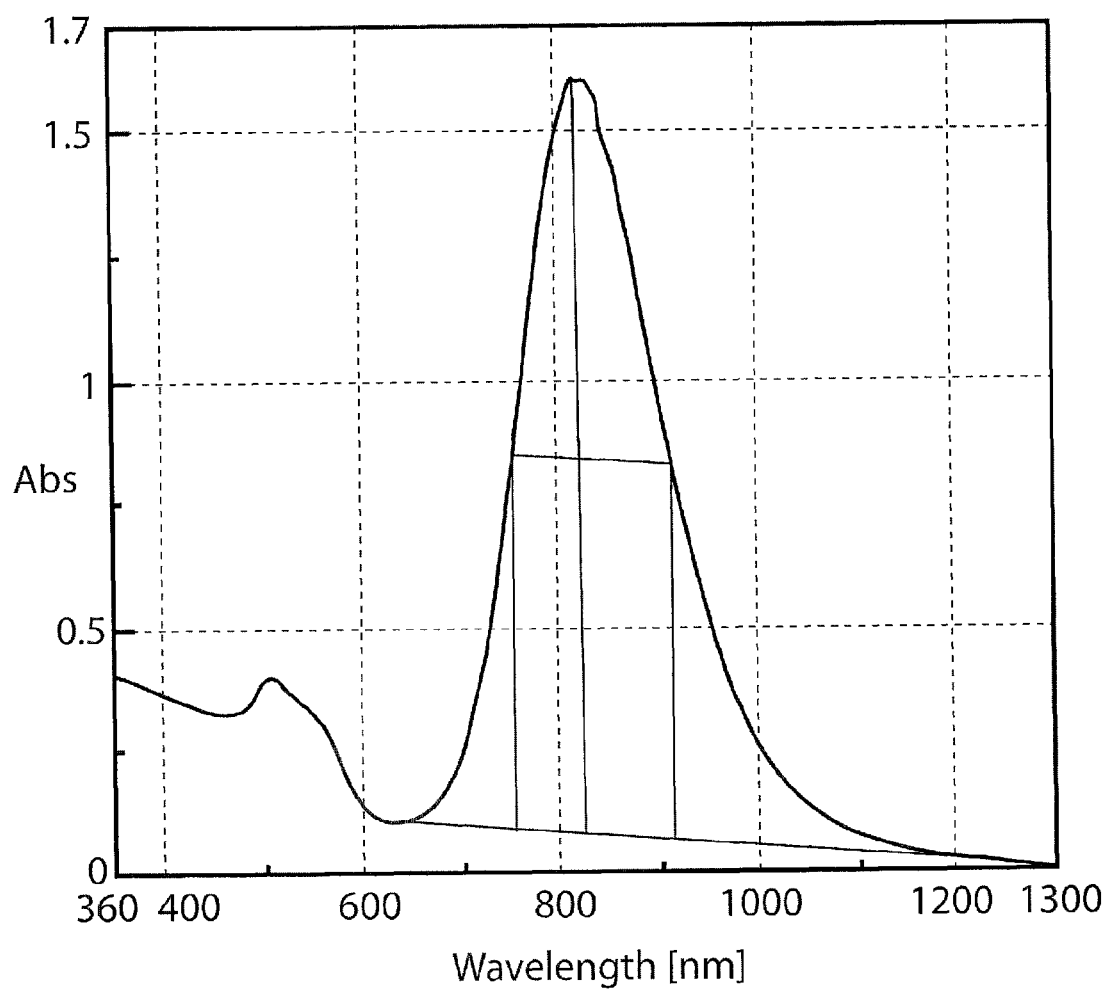
FIG. 1 is an absorption spectral figure of a gold nano-rods dispersed aqueous solution of Example 1.

In the gold nano-rods of the present invention, a half band width of an absorption spectrum at the maximum absorption wavelength is 200 nm or less. FIG. 1 is an absorption spectral figure when gold nano-rods of the present invention are dispersed in water. As shown in FIG. 1, a peak position of the maximum absorption wavelength of the gold nano-rods of the present invention is 822 nm, and the absorbance at the peak position is about 1.53. In addition, half band positions of the maximum absorption wavelength are about 760 nm at a short wavelength side and about 910 nm at a long wavelength side, and a half band width is about 150 nm.

The metal fine particles such as gold nano-rods of the present invention yield a composition by adding a dispersant, a dispersion medium, and a binder (resin). For example, the metal fine particle composition of the present invention is obtained by dispersing the metal fine particles in a dispersion medium in a presence of a dispersant, and the obtained dispersed solution is mixed with a binder.

Examples of the dispersant include a basic high molecular type dispersant which has a principal chain comprising absorption portions such as a nitrogen atom and sulfur atom which have high absorption capacity against the gold nano-rods, and a plurality of side chains having an affinity to non-aqueous organic solvents such as water and alcohol. Examples of a preferable commercially available dispersant include Solsperse 13940, Solsperse 24000SC, Solsperse 28000, and Solsperse 32000 (marketed by Avecia Ltd.), Flowlen DOPA-15B, and Flowlen DOPA-17 (marketed by KYOEISHA CHEMICAL Co., LTD.), and Ajisper PB815 and Ajisper PB711 (marketed by Ajinomoto Fine-Techno Co., Inc.).

When a synthesis solution containing chloroauric acid and hexadecyltrimethylammonium bromide (CTAB) is used, CTAB sometimes adheres to the surface of the obtained metal fine particles. In this case, when the above listed dispersant is used, CTAB adhered to the surface of the metal fine particles is replaced with the dispersant, and thereby dispersibility to resins and the like is improved.

Any resin can be used as the binder (resin), as long as it has transparency to light from visible light to near infrared light which is generally used for coating or molding. Examples of the resin used as the binder include organic resins such as acrylic resin, polyester resin, alkyd resin, urethane resin, silicone resin, fluororesin, epoxy resin, polycarbonate resin, polyvinyl chloride resin, polyvinyl alcohol resin, and radical polymerizable oligomer and monomer (possibly together with a curing agent and/or a radical polymerization initiator).

The metal fine particle composition of the present invention may contain a solvent, if necessary. As the solvent used in the present invention, any solvent which stably dissolves or disperses the binder is used. Examples of the solvent used in the present invention include alcohols such as methanol, ethanol, propanol, hexanol, and ethylene glycol; aromatic hydrocarbons such as xylene, and toluene; aliphatic hydrocarbons such as cyclohexane; ketones such as acetone and methyl ethyl ketone; esters such as ethyl acetate, and butyl acetate; ethers such as ethylene glycol monobutyl ether; and a mixture thereof, in addition to water. However, the solvents used in the present invention are not limited to these solvents. That is, the metal fine particle composition of the present invention may be an aqueous dispersed solution in which metal fine particles are dispersed in water. The method for using the metal fine particle composition is not limited.

The metal fine particle composition of the present invention may contain a dye or pigment for color correction and the like. Furthermore, the metal fine particle composition may contain one or more kinds of gold nano-rods having the same or different wavelength absorption range.

The metal fine particle composition of the present invention may be used as a variety of embodiments such as a coating, film, and plate containing the same, in addition to a coating composition, and a painting composition.

In addition, the metal fine particle composition of the present invention is used together with a substrate such as transparent glass and plastic. When the metal fine particle composition is used together with such a substrate, this is coated on the substrate by various coating manners such as brush coating, spray coating, roll coating, spine coating, and dip coating.

The metal fine particle composition of the present invention is used in not only a coating method but also in a method in which the metal fine particle composition is injected into a mold, i.e., injection molding method, and a method in which the metal fine particle composition is kneaded with a binder (resin) and molded. The usage of the metal fine particle compositions of the present invention is not limited to these methods.

When the metal fine particle composition in which the metal fine particles are mixed in the binder (resin) is used as a material for an optical filter, the content of the metal fine particles is preferably in a range from 0.01 part by weight to 90 parts by weight, relative to 100 parts by weight of the binder (resin). If the content is less than 0.01 part by weight, it is difficult to yield sufficiently desired effects. In contrast, if the content exceeds 90 parts by weight, it is disadvantage for cost.

A transparent polymer film in which the metal fine particles are kneaded in a resin, or a transparent substrate comprising a coating layer in which the metal fine particles are dispersed in the surface thereof is used as an optical filter which absorbs a specific wavelength in a near infrared light region in a range from 800 nm to 1,200 nm.

For example, the optical film can be produced by the following method.

(a) The composition of the present invention is directly coated or printed on the transparent substrate, and hardened to produce a visible light • near infrared light absorption filter. (b) The composition of the present invention is made into a film or plate to produce a visible light • near infrared light absorption filter, and the obtained absorption filter is laminated on a transparent substrate, or a transparent substrate is covered with the obtained absorption filter. (c) The hardened coating or film containing the composition of the present invention is laminated on a transparent substrate made of glass or plastic, and the obtained laminate is further laminated on another substrate or another substrate is covered with the obtained laminate, as a visible light • near infrared light absorption filter.

The thickness of the coating film or filter is preferably in a range from approximately 0.01 μm to 1 mm, and when cost and light transparency are concerned, it is more preferably in a range from 0.05 μm to 300 μm.

The obtained metal fine particles and the metal fine particle composition are used as a wiring material, electrode material, catalyst, pigment, cosmetic, near infrared light absorbing material, anticounterfeit ink, electromagnetic interference shielding materials, surface reinforcing fluorescence sensor, biomarker, nano-waveguide, recording material, recording element, polarization material, drug supporter for drug delivery system (DDS), biosensor, DNA chip, and test drug, in addition to the optical filter material.

A solution in which the metal fine particles of the present invention are dispersed is used as an anticounterfeit ink. In the aniticounterfeik ink, the specific wavelength absorption property, scattered light, or fluorescence of the metal fine particles is used in a detecting method. Specifically, since the gold nano-rods absorb a specific wavelength in a range from 600 nm to 1,500 nm, a detection wavelength is set in this range. When the specific absorption wavelength is set in a range from 760 nm to 1,500 nm, an invisible ink, which is transparent in a visible light region, is obtained. Since the invisible ink can be discerned in a near infrared light region, this is used as an anticounterfeik ink. Since a film coated with the anticounterfeik ink comprises the metal fine particles of the present invention, that is, metal nano-rods, the film is excellent in weather resistance, heat resistance, and chemical resistance.

Any dispersant is used for surface treatment of the metal nano-rods, as long as it is compatible with a solvent used. A solvent for the anticounterfeik ink is selectable.

The metal fine particles of the present invention are also used as a pigment. When the metal fine particles, that is, metal nano-rods of the present invention are dispersed in an oily material, it is difficult to observe the metal nano-rods as particles by the naked eye, and when this is coated, a coating film having high transparency is obtained. Therefore, when the metal fine particles of the present invention are used as a pigment for a cosmetic, although the content is small, a cosmetic having strong tinctorial power and high chroma is obtained.

The metal fine particles of the present invention are also used as a conductive material. A conductive paste containing the metal fine particles of the present invention is used as a wiring material or electrode material. A wiring or electrode, which is obtained by coating or printing the conductive paste on an insulating substrate, and dried (burned), is excellent in conductivity, and migration resistance. When a conductive paste is obtained by using the metal fine particles of the present invention, it is preferable that 1 to 20 parts by weight of a binder is added relative to 100 parts by weight of the metal nano-rods.

It is well-known that infrared light absorption or fluorescence emission is amplified by fixing metal fine particles, that is, metal nano-particles, on the surface of a glass substrate with high density. Spectroscopy utilizing this is called as "Surface Enhanced IR Spectroscopy (SEIRS)" or "Surface Enhanced Fluorescence Spectroscopy (SEFS)". In particular, SEFS is known as being a simple technique. The metal fine particles of the present invention are suitable as a sensor material used for SEIRS or SEFS. For example, because gold nano-rods have a wavelength region having a small absorbance in a wavelength range from 550 nm to 800 nm, a glass substrate having the surface on which gold nano-rods treated with a silane treatment agent having a thiol-terminal (3-mercaptopropyltrimethylsilane, and the like) are fixed with high density is suitable for SEFS spectrometry using a fluorescent material emitting fluorescent light in this wavelength (for example, rhodamine type fluorescent pigment) as a marker.

The metal fine particles of the present invention are used as a biomarker which responds to near infrared light. For example, most near infrared light in a range from 750 nm to 1,100 nm is not absorbed in organic matter, but gold nano-rods have distinctive absorption properties in a wavelength region from 750 nm to 1,100 nm, depending on the aspect ratio thereof. When a specific portion of the organism is dyed by the gold nano-rods, near infrared light is absorbed in the portion by irradiating near infrared light, so the portion can be determined Therefore, it is possible to observe any portion dyed with the gold nano-rods in an organism having a large thickness, in which a measurement is impossible due to suspension or coloring by conventional methods.

Specifically, an organism is dyed with the gold nano-rods of the present invention by covering with a compound having high biocompatibility such as polyethylene glycol, phospholipids, sugar chain, and antibody. Gold nano-rods which are covered with polyethylene glycol or phospholipids are preferably used for dying uniformly without local presence in a specific organ or tissue. In particular, polyethylene glycol is preferable as a coating agent for vital staining, because it is hardly affected by vital decomposition action and has high permeability in a cell. In contrast, sugar chain and antibody are preferably used for dying a specific organ or tissue, because they are accumulated in the specific organ or tissue. It is possible to observe biomedical materials which have not previously been observed, using the gold nano-rods covered with these materials.

When the metal fine particles of the present invention are arranged regularly in one dimension with high density, light propagates among the particles due to an interaction of near-field light which is generated near the nano-particles. Due to this, it is possible to produce a nano-waveguide suitable for a one-diementional waveguide. For example, a nano-waveguide is produced by the following method. First, the metal nano-rods are arranged in one dimension using an atom force microscope (AFM) or scanning tunneling microscopy (STM) as a manipulator. Then, luminous nano-particles (zinc oxide, CdTe, or the like) are fixed at the one end of the nano-rods arranged in one dimension, and an optical fiber sensor of a near-filed microscope is positioned at the other end of the arrangement to form a nano-waveguide. The metal nano-rods of the present invention are preferably used as such a nano-waveguide.

The production methods for the metal fine particles are explained below.

The first production method of the present invention is a method in which metal ions are reduced in an aqueous solution containing a surfactant, wherein an aspect ratio of the metal fine particles is controlled by promoting the production of the metal fine particles under conditions in which an acid or alkali is added.

The second production method of the present invention is a method in which metal ions are reduced in an aqueous solution containing a surfactant, wherein an aspect ratio of the metal fine particles is controlled by performing the reduction reaction while adjusting a solution temperature.

In the production methods of the present invention, nitric acid, sulfuric acid, hydrochloric acid, hydrobromic acid, and the like are used as the acid, and sodium hydroxide, potassium hydroxide, aqueous ammonia, and the like are used as the alkali.

As a method for reducing metal ions in an aqueous solution containing a surfactant in the production methods of the present invention, a chemical reduction method, electrochemical reduction method, photoreduction method, or combination of a chemical reduction method and a photoreduction method can be used.

As explained above, the chemical reduction method is a method in which metal ions are reduced using a reducing agent. The electrochemical reduction method is a method in which metal ions eluted from an anode are reduced at a cathode by flowing a current thorough an electrolyte. The photoreduction method is a method in which metal particles are reduced by irradiating ultraviolet light, for example. The combination of a chemical reduction method and a photoreduction method is a combination of the chemical reduction method and the photoreduction method.

More specifically, in the first production method in which the aspect ratio of the metal fine particles is controlled by adding an acid or alkali, when the electrochemical reduction method is used, the aspect ratio of the metal nano-rods is controlled by adding the acid or alkali to the electrolyte and flowing a constant current.

As explained above, the electrochemical reduction method is a method in which metal ions eluted from an anode are reduced at a cathode. For example, metal nano-rods are produced efficiently by using an aqueous solution containing at least one of the surfactants denoted by the following chemical formulas A, B, and C as an electrolyte.

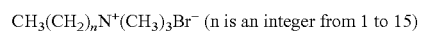

$CH_3(CH_2)_nN^+(CH_3)_3Br^-$ (n is an integer from 1 to 15)　　　A

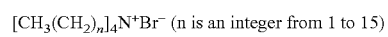

$[CH_3(CH_2)_n]_4N^+Br^-$ (n is an integer from 1 to 15)　　　B

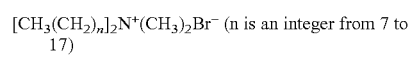

$[CH_3(CH_2)_n]_2N^+(CH_3)_2Br^-$ (n is an integer from 7 to 17)　　　C

A representative example of the surfactant denoted by the chemical formula A is hexadecyltrimethylammonium bromide (CTAB: $CH_3(CH_2)_{15}N^+(CH_3)_3Br^-$). A representative example of the surfactant denoted by the chemical formula B is tetrabutylammonium bromide (TC4AB). A representative example of the surfactant denoted by the chemical formula C is dodecyldimethylammonium bromide (DDAB: $[CH_3(CH_2)_{11}]_2N^+(CH_3)_2Br^-$).

The production of the metal nano-rods is stabilized by using a ketone simultaneously.

In the first production method of the present invention, it is preferable that the acid or alkali be added to an aqueous solution containing at least one of the surfactants denoted by A, B, and C, as an electrolyte.

As the combination of the chemical reduction method and the photoreduction method, a method is known, in which a solution containing a reducing agent in a metal salt solution containing a surfactant is used as a reaction solution, and the reaction solution is irradiated with ultraviolet light to produce metal nano-rods. The aspect ratio of the metal nano-rods is controlled by adding the acid or alkali in the reaction solution, and then irradiating ultraviolet light to the reaction solution.

As the reducing agent used in the combination of the chemical reduction method and the photoreduction method, it is preferable to use a reducing agent having relatively weak reducing power. Examples of the preferable reducing agent include ascorbic acid, citric acid and salts thereof; hydroxylamine hydrochloride, a hydrazine compound, succinic acid, and salts thereof; and amines.

Examples of the acid, which is preferably added to the metal ion solution containing a reducing agent, include nitric acid, sulfuric acid, hydrochloric acid, and hydrobromic acid. Examples of the alkali include sodium hydroxide, potassium hydroxide, and aqueous ammonia.

In the combination of the chemical reduction method and the photoreduction method, specifically, the method in which metal nano-rods are produced by performing chemical reduction and ultraviolet light irradiation, a solution containing at least one of the surfactants denoted by the chemical formulas A, B, and C, in which a metal salt is added, is used as a reaction solution, and a chemical reduction is conducted by adding a reducing agent such as ascorbic acid. When ascorbic acid is added, the reaction solution is transparent and colorless due to a reduction reaction.

When a ketone such as acetone is added to the reaction solution, the production reaction of the metal nano-rods is stabilized. The growth of the metal nano-rods in the long axis is promoted by adding silver salts such as silver nitrate, silver chloride, and silver bromide.

To the transparent and colorless reaction solution, to which the reducing agent was added, the acid such as nitric acid, sulfuric acid, hydrochloric acid, and hydrobromic acid or the alkali such as sodium hydroxide, potassium hydroxide, and aqueous ammonia is added. The aspect ratio of the metal nano-rods is controlled by irradiating ultraviolet light. The irradiation time is several minutes. If necessary, after irradiation of ultraviolet light, the solution may be left to rest under dark conditions.

When the reduction method of the metal ions differs, functions of the acid or alkali added also differ. For example, the functions of the acid or alkali differ between the electrochemical reduction method and the combination of the chemical reduction method and the photoreduction method.

In the electrochemical reduction method, the aspect ratio of the metal fine particles is made small by adding a certain amount of the acid. In contrast, the aspect ratio thereof is made large by adding a certain amount of the alkali.

In the combination of the chemical reduction method and the photoreduction method, the aspect ratio of the metal fine particles is made large by adding a certain amount of the acid, or this is made small by adding a certain amount of the alkali. The exact amount of the acid or alkali varies depending on the kind of the acid or alkali, or the amount of other additives.

Gold nano-rods, which are preferable among the metal fine particles of the present invention, are produced by the combination of the chemical reduction method and the photoreduction method. Specifically, in the method in which chloroauric acid in a solution is chemically reduced, and then this is photoreduced, chemical reduction conditions and photoreduction conditions, that is, light irradiation conditions are adjusted to obtain preferable gold nano-rods. For example, hexadecyltrimethylammonium bromide (CTAB) is added in a chloroauric acid aqueous solution used as a synthesis solution so that the concentration is 0.24 to 0.8 mol/L, and then acetone and cyclohexane are added thereto, and the chloroauric acid is reduced by adding the reducing agent such as ascorbic acid. After the chemical reduction, light irradiation is performed to grow the gold nano-rods. In this case, a peak position in the maximum absorption wavelength is transferred to the long wavelength side by adding 0.01 to 1.0% by weight of cyclohexanone together with CTAB. In addition, the aspect ratio of the gold fine particles is controlled by adjusting the light irradiation time, light strength, or after irradiation, leaving the solution under conditions in which light is blocked. Thereby, the gold fine particles having a desired aspect ratio are obtained.

In the second production method of the present invention in which the liquid temperature is adjusted to perform the reduction reaction, for example, when the electrochemical reduction method is adopted, the aspect ratio of the metal nano-rods is controlled by conducting the electrolytic reaction while the temperature of the electrolyte is maintained in a certain range. In addition, when the chemical reduction method, photoreduction method, or the combination of the chemical reduction method and the photoreduction method is adopted, the aspect ratio of the metal nano-rods is controlled by conducting the reaction while the temperature of the reaction solution is maintained in a certain range.

Specifically, when the combination of the chemical reduction method and the photoreduction method is adopted, the aspect ratio of the metal nano-rods is controlled by irradiating ultraviolet light while the temperature of the reaction solution, which is obtained by adding the reducing agent to the metal salt aqueous solution containing the surfactant, is maintained in a certain range.

In the second production method in which the liquid temperature is adjusted, the aspect ratio is made small by raising the liquid temperature, or this is made large by lowering the liquid temperature. Specifically, the higher the liquid temperature is raised above the precipitation temperature of the surfactant, the smaller the aspect ratio is, and the production amount of the spherical fine particles increases. When the liquid temperature is near the precipitation temperature, the aspect ratio is large. When the liquid temperature is lower than the precipitation temperature of the surfactant, the production amount of the metal nano-rods decreases. For example, the precipitation temperature of CTAB is about 25° C. When productivity is concerned, the upper limit of the liquid temperature is preferably in a range from 40 to 60° C., and the lower limit is preferably in a range from 26 to 30° C. Among these temperature ranges, the liquid temperature is further adjusted based on the fact that the higher liquid temperature is raised above the precipitation temperature, the smaller aspect ratio is, and that the aspect ratio is large when the liquid temperature is around the precipitation temperature.

Below, the present invention will be explained with reference to examples. The examples relate mainly to gold nano-rods, and show light absorption properties in a wavelength range from 800 to 900 nm. However, the same light absorption properties are obtained in a wavelength range from 550 to 1,200 nm by changing the aspect ratio of the gold nano-rods.

Spectral characteristics were measured using V-570 manufactured by JASCO Corporation. In addition, in the case of other metals, the same results were obtained.

EXAMPLE 1

Production Method for Gold Fine Particles

To 50 ml of 0.50 mol/L-CTAB (hexadecyltrimethylammonium bromide) aqueous solution, 5 ml of 24 mmol/L-chloroauric acid aqueous solution, 1 ml of acetone, 1 ml of cyclohexane, 1 ml of cyclohexanone, and 5 ml of 10 mmol/L-silver nitrate aqueous solution were added to produce the reaction solution. To the reaction solution, ml of 40 mmol/L-ascorbic acid (AS) aqueous solution was added to initiate chemical reduction. Just after the AS aqueous solution was added, the color of the reaction solution changed from orange to transparent and colorless. The transparent and colorless solution was put into a 100 ml-beaker, and ultraviolet light generated in a UV irradiation device (high-pressure mercury lamp) was irradiated directly onto the synthesis solution from the upper part of the beaker for five minutes. After irradiation, the synthesis solution was left to rest for one hour, and transferred to a storage vessel. Then the solution was ten-times diluted by adding water (in volume ratio, gold fine particle concentration: $1.6 \times 10^{-4}$ mol/L) to obtain a sample for measurement of absorption spectrum. The absorption spectrum is shown in FIG. 1.

As shown in FIG. 1, the peak position of the maximum absorption wavelength of the gold fine particles (gold nano-rods) was 822 nm, the positions of the half band width of the absorption spectrum were respectively about 760 nm at the short wavelength side and about 910 nm at the long wavelength side, and therefore, the half band width of the absorption spectrum was about 150 nm. In addition, in the case where the gold fine particle concentration was $1.6 \times 10^{-4}$ mol/L, and the length of the measurement cell was 1 cm, the absorbance at the maximum absorption wavelength was 1.53. Therefore, the absorption coefficient, which was calculated from the Lambert Beer formula [1], was about 9,563 L/mol·cm.

EXAMPLE 2

Gold Fine Particles Surface-Treated with a Dispersing Agent 0.1 g of the dispersing agent (Solsperse 24000SC; marketed by Avecia Ltd.) was dissolved in 10 g of toluene. To the toluene solution containing the dispersing agent, 50 g of the aqueous dispersing solution of the gold nano-rods (the average length in the short axis: 10 nm; the average length in the long axis: 42 nm, and the aspect ratio: 4.2) synthesized in Example 1, was added, and they were aggregated for ten minutes using an aggregator (revolution speed: 300 rpm). To the obtained solution, 30 g of ethanol was added, and this was left to rest for twenty-four hours. The solubility of CTAB increased by adding ethanol, and CTAB absorbed in the surface of the gold nano-rods was desorpted. Then, nitrogen portions of the dispersing agent were absorbed in gold nano-rods and they were replaced with CTAB, and the surface treatment was performed.

The mixture, which was left to rest, was separated into a transparent and colorless water phase and a vivid red toluene phase. After that, only the organic solvent phase was eluted, and excess toluene was removed using an evaporator to produce the gold nano-rods concentrated solution of toluene (gold fine particle content: 10% by weight; solid content: 40% by weight). When the concentrated solution was diluted by adding toluene to 10,000 times (in volume), the gold nano-rods were not coagulated, and dispersed stably. The absorption spectrum of the concentrated and dispersed solution is shown in FIG. 2.

Figure 2:
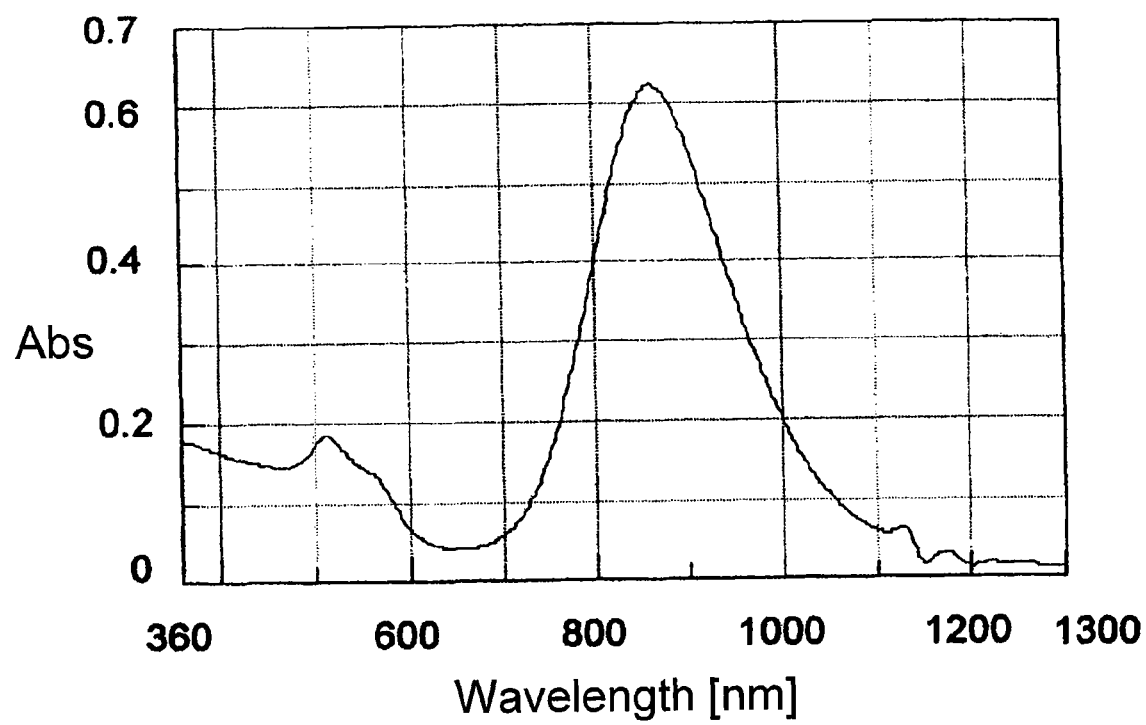
FIG. 2 is an absorption spectral figure of a gold nano-rods concentrated solution of Example 2.

As shown in FIG. 2, the absorption spectrum changed by the surface treatment of the dispersing agent, and the peak position of the maximum absorption wavelength transferred from 822 nm to 864 nm. This was caused by a change of the refractive index of the material on the surface of the gold nano-rods.

EXAMPLE 3

Gold Fine Particle Composition and Film

The coating was obtained by mixing 5 g of the gold nano-rods concentrated solution obtained in Example 2 in 20 g of a mixture containing a radical polymerizable urethane oligomer and a radical polymerization initiator. The obtained coating did not change color or generate precipitations, and was stable even though it was left under conditions in which light was blocked and at room temperature for three months or longer.

Figure 3:
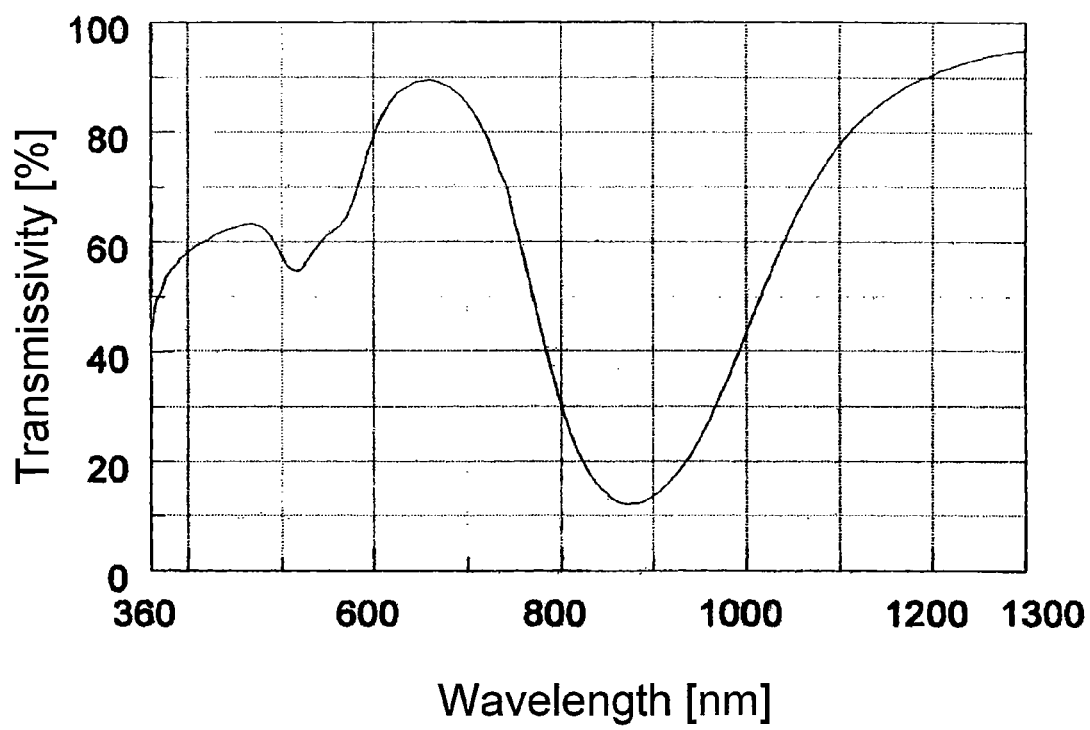
FIG. 3 is a transmitted spectral figure of a coating made of a gold nano-rods containing coating of Example 3.

The coating was coated on the glass plate (gold fine particle content: 1% by weight, and dried film thickness: 10 μm), and the transmitted spectrum was measured. The results are shown in FIG. 3. As shown in FIG. 3, the transmissivity around the wavelength (870 nm) which corresponds to the peak position of the maximum absorption wavelength shown in FIG. 2 was the lowest. Thereby, it was confirmed that the specific wavelength was absorbed by the gold nano-rods.

EXAMPLE 4

(Solution A)

To 405 ml of 480 mmol/L-CTAB aqueous solution, 34 ml of 24 mmol/L-chloroauric acid aqueous solution, 6 ml of acetone, 0.7 ml of cyclohexanone, and 25 ml of 10 mmol/L-silver nitrate aqueous solution were added to produce the reaction solution. To the reaction solution, 33 ml of 40 mmol/L-ascorbic acid aqueous solution was added to initiate chemical reduction. Just after the ascorbic acid aqueous solution was added, the color of the reaction solution changed from orange to transparent and colorless. Ultraviolet light generated by a high-pressure mercury lamp of 10 mW/cm$^2$ or less was irradiated directly onto the transparent and colorless solution from the upper part thereof for five minutes.
(Solution B)

The reaction solution was produced in the same manner as the solution A, and then chemical reduction was conducted. To the obtained reaction solution, 150 μL of commercial strength nitric acid (concentration: about 60%) was added, and then ultraviolet light generated by a high-pressure mercury lamp of 10 mW/cm$^2$ or less was irradiated directly onto the solution from the upper part thereof for five minutes.
(Solution C)

The reaction solution was produced in the same manner as the solution A, and then chemical reduction was conducted. To the obtained reaction solution, 2.5 ml of 1 mol/L-sodium hydroxide aqueous solution was added, and then ultraviolet light generated by a high-pressure mercury lamp of 10 mW/cm$^2$ or less was irradiated directly onto the solution from the upper part thereof for five minutes.

Figure 4:
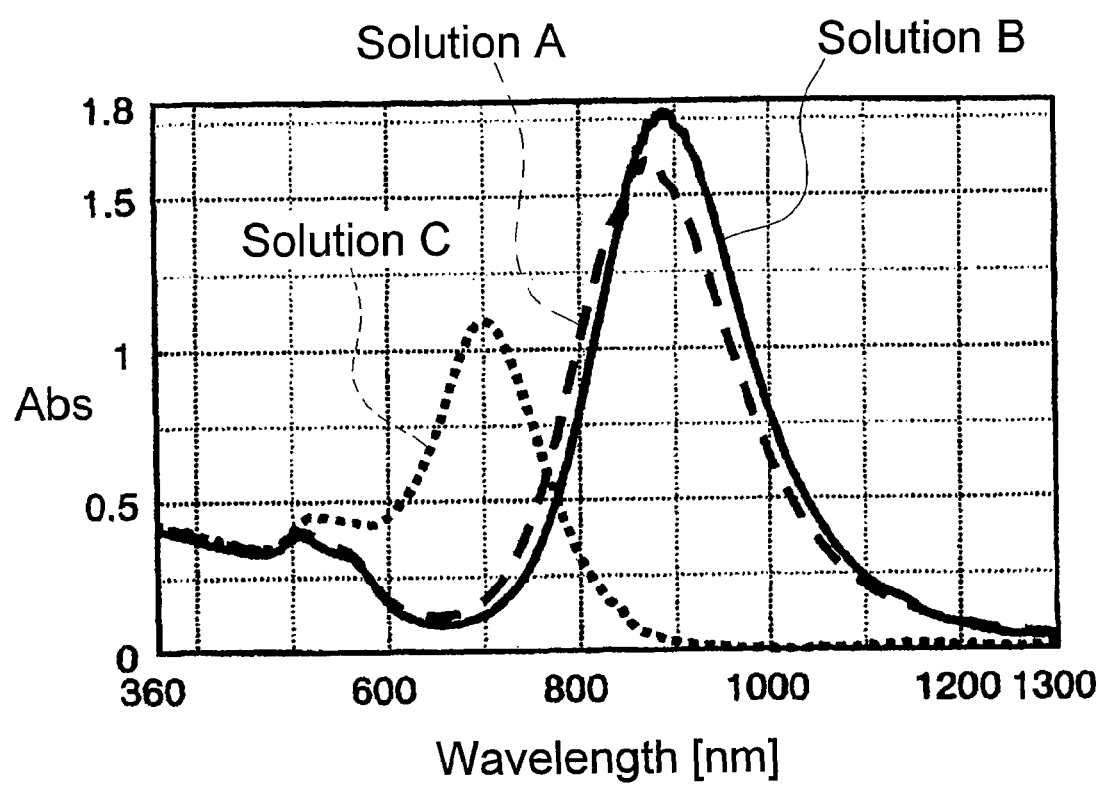
FIG. 4 is an absorption spectral figure showing results of Example 4.

The absorption spectrums of the solutions A, B, and C are shown in FIG. 4. As shown in FIG. 4, the absorption peak of the solution B, in which nitric acid was added, is shifted to the long wavelength side, compared with the solution A. This showed that 4.7 (the length in the long axis: 42.3 nm), which was the aspect ratio of the gold nano-rods in the solution A, increased to 5.0 (the length in the long axis: 45.0 nm) which was the aspect ratio of the gold nano-rods in the solution B. The absorption peak of the solution C, in which sodium hydroxide was added, was shifted to the short wavelength side, and this showed that the aspect ratio of the gold nano-rods decreased to 3.0 (the length in the long axis: 27.0 nm).

EXAMPLE 5

(Solution A)

To 405 ml of 480 mmol/L-CTAB aqueous solution, 34 ml of 24 mmol/L-chloroauric acid aqueous solution, 6 ml of acetone, 0.7 ml of cyclohexanone, and 25 ml of 10 mmol/L-silver nitrate aqueous solution were added to produce the reaction solution. To the reaction solution, 33 ml of 40 mmol/L-ascorbic acid aqueous solution was added to initiate chemical reduction. Just after the ascorbic acid aqueous solution was added, the color of the reaction solution changed from orange to transparent and colorless. The temperature of the transparent and colorless solution was maintained at 40° C., and ultraviolet light generated by a high-pressure mercury lamp of 10 mW/cm$^2$ or less was irradiated directly onto the solution from the upper part thereof for five minutes.

(Solution B)

The reaction solution was produced in the same manner as the solution A, and then chemical reduction was conducted. The temperature of the obtained reaction solution was maintained at 26° C., and then ultraviolet light generated by a high-pressure mercury lamp of 10 mW/cm$^2$ or less was irradiated directly onto the solution from the upper part thereof for five minutes.

Figure 5:
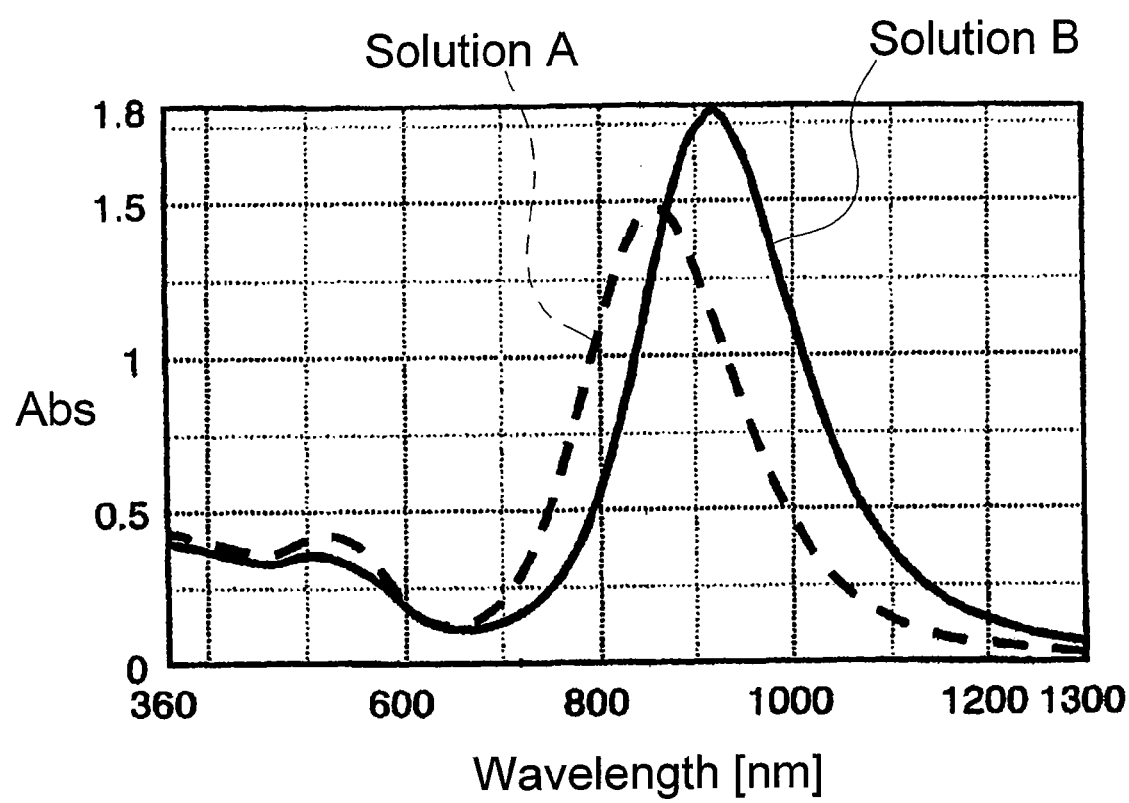
FIG. 5 is an absorption spectral figure showing results of Example 5.

The absorption spectrums of the solutions A and B are shown in FIG. 5. As shown in FIG. 5, the absorption peak of the solution B, of which the solution temperature is lower than that of the solution A, is shifted to the long wavelength side. This showed that 4.6 (the length in the long axis: 41.4 nm), which was the aspect ratio of the solution A, increased to 5.3 (the length in the long axis: 47.7 nm) which was the aspect ratio of the solution B.

EXAMPLE 6

To 1 L of water, the surfactant, acetone, cyclohexane, cyclohexanone, and commercial strength nitric acid (concentration: about 60%) or 1 mol/L-sodium hydroxide aqueous solution were added to produce the electrolytes A, B, and C, that is, the solutions A, B, and C having the compositions shown in Table 1.

TABLE 1

|  | Solution A | Solution B | Solution C |
|---|---|---|---|
| CTAB | 240 mmol/L | 240 mmol/L | 240 mmol/L |
| [CH$_3$(CH$_2$)$_3$]$_4$N$^+$Br$^-$ | 7.3 mmol/L | 7.3 mmol/L | 7.3 mmol/L |
| [CH$_3$(CH$_2$)$_5$]$_4$N$^+$Br$^-$ | 17.0 mmol/L | 17.0 mmol/L | 17.0 mmol/L |
| Acetone | 13 mL | 13 mL | 13 mL |
| Cyclohexane | 13.5 mL | 13.5 mL | 13.5 mL |
| Cyclohexanone | 2.6 mL | 2.6 mL | 2.6 mL |
| Acid or alkali | no addition (pH 4.1) | nitric acid to pH 3 | NaOH to pH 7.1 |

Figure 6:
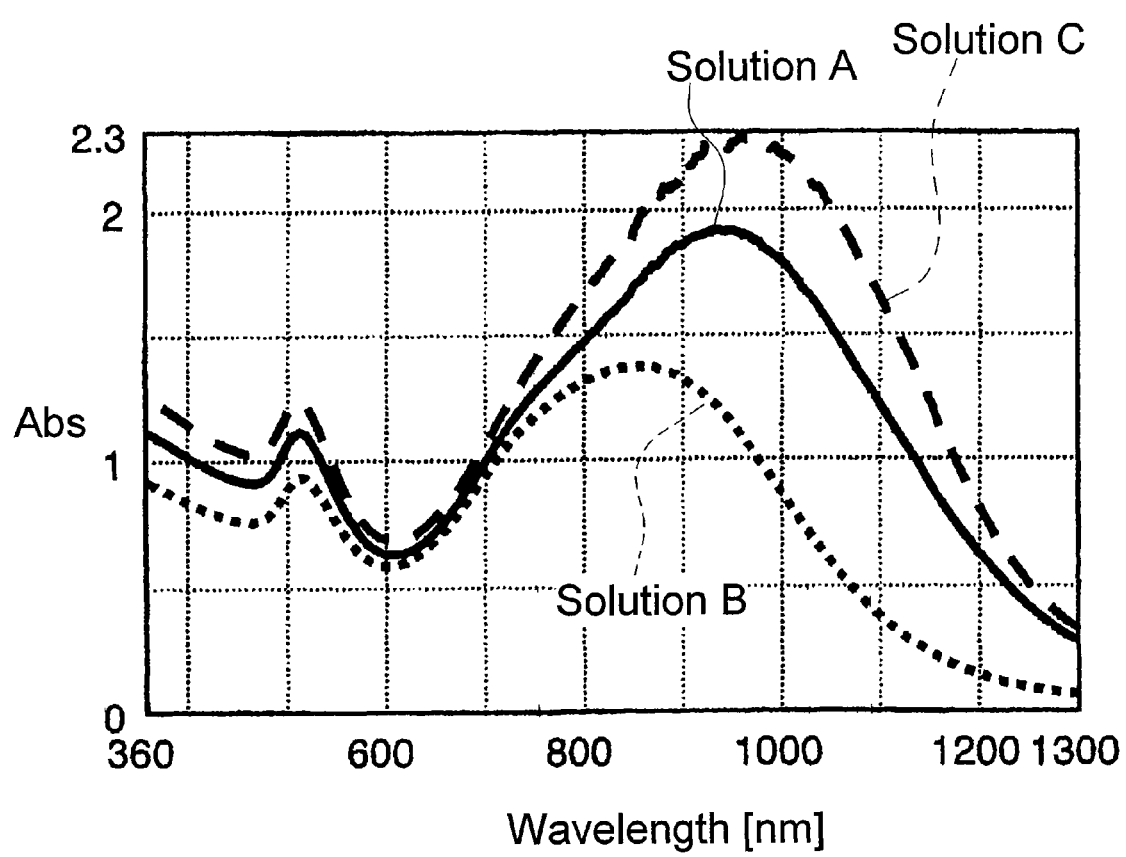
FIG. 6 is an absorption spectral figure showing results of Example 6.

While 3.0 mol/L-silver nitrate aqueous solution was added at a rate of 80 μL/min, the electrolytes A, B, and C were electrolyzed by flowing a constant current of 5.0 mA for four hours and using a gold plate as the anode and a stainless steel plate (SUS 304 plate) as the cathode. The absorption spectrums of the solutions A, B, and C after electrolysis are shown in FIG. 6. As shown in FIG. 6, the absorption peak of the solution B, in which nitric acid was added, is shifted to the short wavelength side, compared with that of the solution A. This showed that 5.5 (the length in the long axis: 49.5 nm), which was the aspect ratio of the gold nano-rods of the solution A, decreased to 4.8 (the length in the long axis: 43.2 nm), which was the aspect ratio of the gold nano-rods of the solution B. In addition, the absorption peak of the solution C, in which sodium hydroxide aqueous solution was added, was shifted to the long wavelength side, and this showed that the aspect ratio of the gold nano-rods increased to 5.8 (the length in the long axis: 52.2 nm).

INDUSTRIAL APPLICABILITY

The metal fine particles (metal nano-rods) of the present invention have the aspect ratio in a range from 1.1 to 8.0, and selective wavelength absorption properties in a range from visible light to near infrared light of 400 nm to 1,200 nm. Therefore, it is possible to yield various tones.

In addition, the absorption coefficient at the peak position of the maximum absorption wavelength of the metal fine particles according to the present invention is in a range from 6,000 to 20,000 L/mol·cm (measurement concentration: 1.6× 10$^{-4}$ mol/L, and solvent: water), and this has excellent absorbance. In addition, the half band width of the absorption spectrum at the maximum absorption wavelength of the metal fine particles according to the present invention is 200 nm or less, and this has a narrow absorption spectrum. Therefore, the metal fine particles of the present invention have sharp absorption properties and influences little the surrounding wavelength, and therefore, they yield tones having high chroma.

In addition, the metal fine particles of the present invention are metal, so they are excellent in heat resistance, light resistance, and chemical resistance. The composition containing the metal fine particles does not generate color deterioration and does not decrease the absorption capacity thereof, and this has high reliability.

According to the production methods of the present invention, it is possible to control easily the aspect ratio of the metal nano-rods, and produce efficiently the metal nano-rods having a desired aspect ratio.

The coating composition, coating, transparent sheet, or film is obtained by the metal fine particle composition of the present invention.

In addition, the metal fine particles which are produced by the production methods of the present invention are used as a filter material, wiring material, electrode material, catalyst, pigment, cosmetic, near infrared light absorbing material, anticounterfeit ink, electromagnetic interference shielding materials, surface reinforcing fluorescence sensor, biomarker, nano-waveguide, recording material, recording element, polarization material, drug supporter for drug delivery system (DDS), biosensor, DNA chip, or test drug, which contains the metal fine particles.

The invention claimed is:

1. A production method for producing metal fine particles comprising the steps of:
reducing metal ions in an aqueous solution containing a surfactant denoted by at least one of the following chemical formulas A, B, and C as an electrolyte by an electrochemical reduction method

| | |
|---|---|
| $CH_3(CH_2)N^+(CH_3)_3Br$ (n is an integer from 1 to 15) | A |
| $[CH_3(CH_2)_n]_4N^+ Br$ (n is an integer from 1 to 15) | B |
| $[CH_3(CH_2)_n]_2N^+(CH_3)_2Br$ (n is an integer from 7 to 17) | C; and | adding acid into the aqueous solution to make an aspect ratio of the metal fine particles smaller than an aspect of the metal fine particles without adding acid, or adding alkali into the aqueous solution to make an aspect ratio of the metal fine particles larger than an aspect ratio of the metal fine particles without adding alkali.

2. A production method for producing metal fine particles according to claim 1, wherein the acid is selected from the group consisting of nitric acid, sulfuric acid, hydrochloric acid, and hydrobromic acid, and the alkali is selected from the group consisting of sodium hydroxide, potassium hydroxide, and aqueous ammonia.

\* \* \* \* \*